US009485617B2

(12) United States Patent
Tasdemiroglu

(10) Patent No.: US 9,485,617 B2
(45) Date of Patent: Nov. 1, 2016

(54) DYNAMIC LOCATION-BASED MAPPING SYSTEM AND METHOD

(71) Applicant: Sean Tasdemiroglu, Santa Clarita, CA (US)

(72) Inventor: Sean Tasdemiroglu, Santa Clarita, CA (US)

( * ) Notice: Subject to any disclaimer, the term of this patent is extended or adjusted under 35 U.S.C. 154(b) by 0 days.

(21) Appl. No.: 14/596,083

(22) Filed: Jan. 13, 2015

(65) Prior Publication Data

US 2015/0201304 A1 Jul. 16, 2015

Related U.S. Application Data

(60) Provisional application No. 61/927,267, filed on Jan. 14, 2014.

(51) Int. Cl.
*H04W 24/00* (2009.01)
*H04W 4/02* (2009.01)
*H04W 4/20* (2009.01)

(52) U.S. Cl.
CPC ............... *H04W 4/02* (2013.01); *H04W 4/206* (2013.01)

(58) Field of Classification Search
CPC ............................... H04W 4/02; H04W 4/206
See application file for complete search history.

(56) References Cited

U.S. PATENT DOCUMENTS

| | | | |
|---|---|---|---|
| 2007/0281689 A1* | 12/2007 | Altman | G06Q 30/0207 455/435.1 |
| 2010/0280920 A1* | 11/2010 | Scott | G01S 5/0027 |
| 2013/0145288 A1* | 6/2013 | Zadeh | G06F 3/0484 715/753 |
| 2014/0059658 A1* | 2/2014 | Stecher | G06F 21/45 726/5 |
| 2014/0059693 A1* | 2/2014 | Stecher | H04L 63/0421 726/26 |
| 2015/0032505 A1* | 1/2015 | Kusukame | G06Q 30/0201 705/7.31 |

\* cited by examiner

*Primary Examiner* — Erin File
(74) *Attorney, Agent, or Firm* — Michael N. Cohen; Cohen IP Law Group P.C

(57) ABSTRACT

A system for providing a geographic location based information having a server which comprises a transceiver which is operated to receive a request for the geographic location based information of the plurality of people and a processor to locate, to determine a count, to represent the count as a pair of counters in a plurality of blocks and update the count at each counter. A user interface is configured to display the plurality of blocks with the pair of counters. The cloud server dynamically stores/updates user settings and interests of all network devices, stores advertisers static locations and updates ads based off users inputs and populates stored information on universal map shared by all users and also receives request to filter user's map by a Label and determines all users in viewing window of map that have that Label saved in their profiles and then sends results to the user.

12 Claims, 10 Drawing Sheets

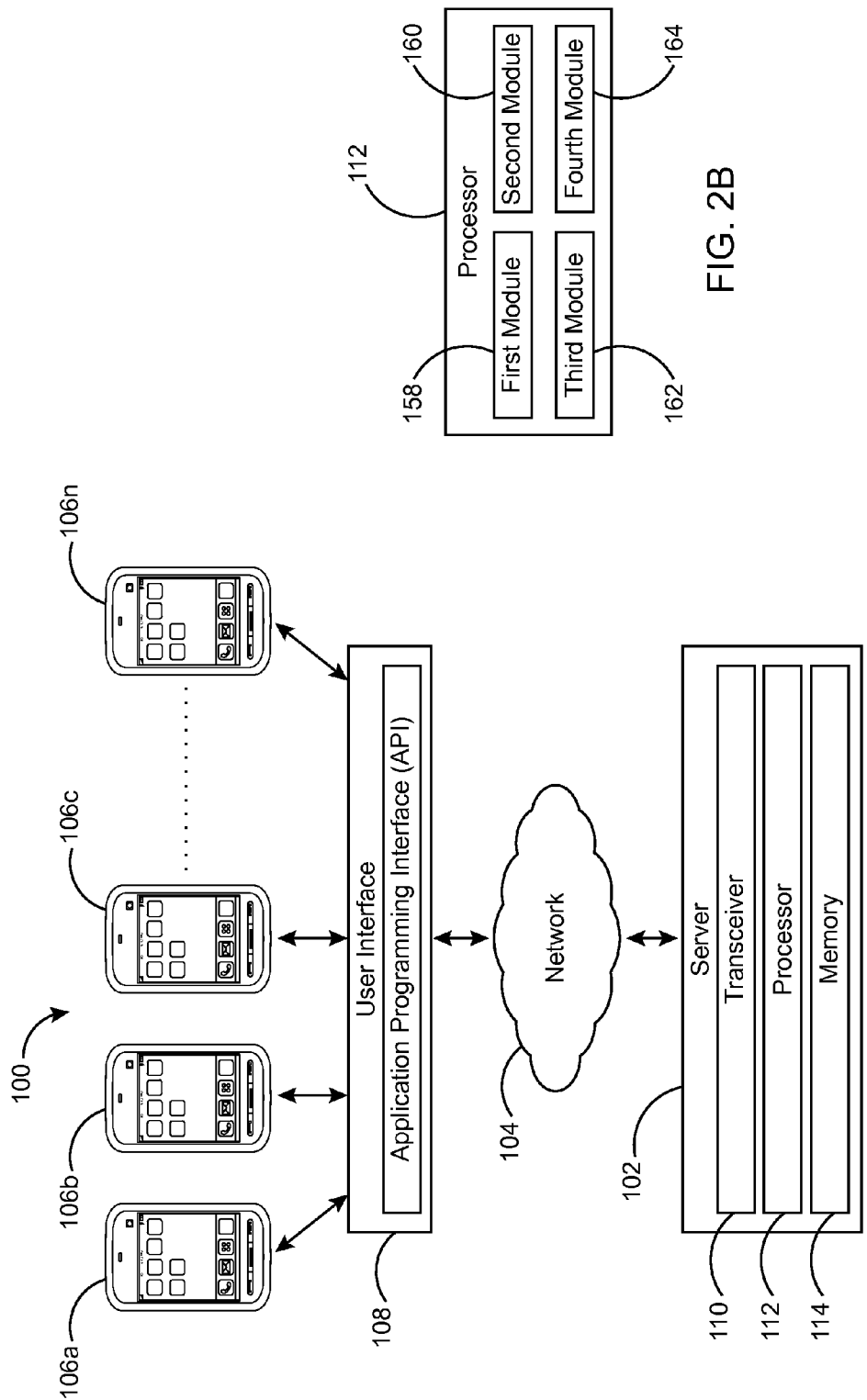

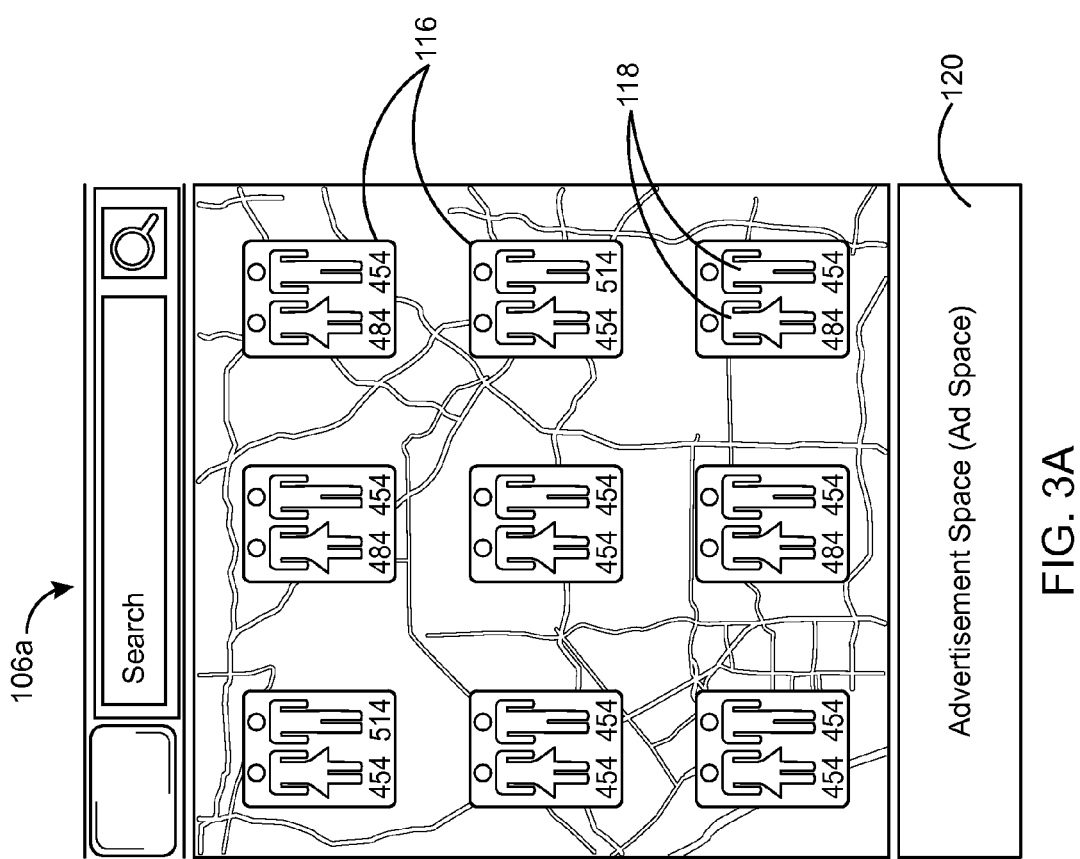

DYNAMIC LOCATION-BASED MAPPING SYSTEM AND METHOD

STATEMENT REGARDING FEDERALLY SPONSORED RESEARCH AND DEVELOPMENT

Not Applicable.

CROSS-REFERENCE TO RELATED APPLICATIONS

Not Applicable.

FIELD OF THE DISCLOSURE

This embodiment relates generally to location mapping and sharing is between a network of devices, and more particularly, to a dynamic location-based mapping system and method configured for providing geographic location-based information of a plurality of people at a plurality of locations based on the demographic characteristic of the plurality of people.

DISCUSSION OF RELATED ART

Electronic location-based mapping systems are useful for allowing users to generate mapping representations for a wide variety of geographical locations. Everyone has a different definition for an ideal location. For instance, young people may define an ideal location as beach or location having a younger crowd, while older people may define an ideal location as park or location with a more relaxed crowd. The question "where is everyone?" is common among people getting ready to go out to a particular location. People may be looking for more specific traits such as the gender mix, age mix etc. The problem is that most people do not exactly know which locations are ideal. When a person determines that he or she wants to visit a location such as a restaurant, a grocery store, bar etc., that person often has to rely on word-of-mouth from others, or reviewing of social networking sites, or blindly select a location without knowing the importance and specialties of that location. Thus, people may choose not to leave home due to the lack of information regarding the location activity.

Recent advances in the art provide electronic location-based mapping systems accessible over wide area networks, such as the Internet, that are widely used to locate the people in the ideal location based on specific traits. The location based mapping systems are configured to provide and display mapping information to handheld devices, such as cellular telephones, handheld computers, personal digital assistants (PDAs) and the like. These handheld devices may communicate with the mapping system wirelessly or through a wired connection to a computer.

Various location sharing and viewing applications have been available via a plethora of networks. However, these location-sharing interfaces do not allow users to simultaneously determine, for example, the ratio of men to women in a particular location. Traditional sharing interfaces do not provide access to paid advertisements by local establishments, events, etc. People using the current location sharing applications cannot view entire continents and determine the count of males and females throughout the viewing area/window which would allow them to get population estimates based on users in a network.

Furthermore, the current applications do not allow people to locate clusters of large amounts of people where they can then zoom to view finer clusters, whether to plan outings around being close to others or avoiding them. For instance, it an individual is new to an area and wants to socialize but doesn't know where their select crowd hangs out, whether it be at the beach, park, etc. the individual might go to the beach with the thought of it being crowded but when he/she arrives realizes its empty. Therefore, the individual may have a difficult time selecting a location or business establishment to visit that is likely to result in a satisfying experience.

Some of the existing systems provide users with the ability to see other users using a maps application programming interface (API) however the users must request to see one another, or the users must create profiles or log in with names, for example, be facebook friends, or already have a relationship. Thus, such systems do not provide anonymity for the users' specific locations. Moreover, these systems do not provide users with the ability to view everyone in the network on the map simultaneously and/or do not have counters that display the count of users in the viewing area of the maps. Some applications are meant for small to medium-scaled location-sharing and the users must create groups where they invite people to share locations.

Some of the other existing systems receive information associated with locations of multiple people, where the information is derived based on each of the people's use of an electronic device. The system cross-references the locations of multiple people to locations of one or more places where people get together to determine the number of people who are located at the one or more places. The system further provides a visual representation of the popularity of each of the places to a user device based on the determined number of the people who are located at one or more places. However, such applications do not embody the concept of anonymity (no user can identify another user) coupled with the ability to only distinguish the count of males and females within a viewing area/window.

Furthermore, some other systems require the personal information of users and the information is viewable to other users. The mobile devices in network are linked to one another and so the exact locations of the users can be viewed. Most of these systems do not have the ability to temporarily disable the viewable location, and cannot set specific locations where the user would not be presented.

Therefore, there is a need for a dynamic location-based mapping system and method configured providing geographic location-based information of a plurality of people at one or more locations based on the demographic characteristic of the people. Such a needed system and method would provide a count of the plurality of people in a designated area based on the demographic characteristic of the people. Further, the needed system and method would provide an integrated application programming interface (API) to show the geographic location-based information of the plurality of people in a plurality of blocks based on the demographic characteristic of the people. In addition, the needed system and method would include a pair of counters in each block, one counter shows the count of males and other one shows the count of females. This needed system and method would determine the ratio of males and females not only within a given location but entire regions on a map. Furthermore, the plurality of blocks would protect the anonymity of people in a viewing area/window, distinguish the count of males and females per block and make it easier for the people to view large counts of people on a map by organizing them into blocks with counters that can be read as numerical figures depicting the population of people in the viewing area/window. Moreover, this system and method would provide access to paid advertisements that can be displayed in the viewing area/window by local establishments, events, etc. The present embodiment accomplishes these objectives.

SUMMARY OF THE DISCLOSURE

The present embodiment is a system for providing the geographic location based information of a plurality of people on a network. The system includes a server that comprises a transceiver that is operated to receive a request for the geographic location based information of the plurality of people and a processor. The processor having a first module which is configured to locate the plurality of people at a plurality of locations based on the received geographic location, a second module to determine a count of the plurality of people at each of the plurality of locations based on a demographic characteristic of the plurality of people and a third module to represent the count of the plurality of people at each of the plurality of locations as a pair of counters in a plurality of blocks based on the demographic characteristic of the plurality of people. Further, the processor having a fourth module is configured to update the count of the plurality of people at each counter in each block of the plurality of blocks based on the demographic characteristic of the plurality of people. The server further comprises a memory that is operated to store information and instructions for execution by the processor.

The plurality of electronic devices is configured to enable a connection with the server via a user interface. The user interface is an application programming interface (API) that is configured to receive the count of the plurality of people, at each of the plurality of locations based on the demographic characteristic of the plurality of people. The user interface is further configured to display the plurality of blocks with the pair of counters. The count of the plurality of people is dynamically updated based on each of the plurality of locations and the demographic characteristic of the plurality of people.

The user interface is provided with a search bar that enables a user to map the plurality of people at the plurality of locations. The demographic characteristic of the plurality of people is categorized by gender to determine a ratio of males to females. The user interface shows the mapping of the plurality of people by the pair of counters in a plurality of blocks. For instance, the plurality of blocks includes nine square blocks with two counters in each block. One counter defines the count of the males and other one defines the count of the females. The plurality of blocks is configured to protect the anonymity of the plurality of the people and the plurality of locations of the plurality of people. The plurality of blocks provides the user the count of the plurality of people at each of the plurality of locations and distinguishes the count of males and females in each block. The system allows the user to view large counts of the plurality of people on the map by organizing into the plurality of blocks with the pair of counters. Each counter denotes a numerical figure of males and females respectively. Thus, the pair of counters in each block of the plurality of blocks separately determines the count of males and females among the plurality of people at the plurality of locations.

In one embodiment, a method for providing geographic location based information of a plurality of people on a network is provided. Initially, the at least one electronic device requests the geographic location based information of the plurality of people at a plurality of locations. A server receives the request through a transceiver. A processor processes the request on the server having a first module to locate the plurality of people at the plurality of locations based on the received geographic location. The processor, having a second module, determines a count of the plurality of people at each of the plurality of locations based on a demographic characteristic of the plurality of people. Then, the third module of the processor represents the count of the plurality of people at each of the plurality of locations as a pair of counters in a plurality of blocks based on the demographic characteristic of the plurality of people.

The count of the plurality of people at each counter in each block of the plurality of blocks is updated based on a demographic characteristic of the plurality of people by the fourth module of the processor. A user interface on the plurality of electronic devices receives the count of the plurality of people at each of the plurality of locations based on the demographic characteristic of the plurality of people. Finally, the user interface on the plurality of electronic devices displays the plurality of blocks with the pair of counters. The pair of counters provides the count of the plurality of people at each of the plurality of locations based on the demographic characteristic of the plurality of people.

The system is configured to stream location data in real time to yield a measure of how busy a number of business locations are. The system allows the users to map search option, filter interests to view others with similar interests, set privacy that allow users the ability to set the home locations as invisible, set additional privacy that allow users the ability to set the current locations to invisible for a range of time up to four hours. Further, ads pop up on bottom of map depending on user's input or just by the user panning the map across a region where businesses are advertising. Multiple advertisements can be visible by swiping banner right or left to view next advertisement. Additionally, advertisement banners can be swiped in an upward motion to show more information. The users can log in by downloading the client-installed application, choosing the option Male or Female. The users can login in by inputting an email address, or logging in with Facebook or Twitter. The system provides the ability to anonymously locate the plurality of people by accessing the GPS information and uploading it to a central server, where it is logged for retrieval. The application checks the user's location and updates the log in regular intervals. Thus the count of females and male are dynamically updated at the pair of counters in the plurality of blocks.

The system allows filtering the map to see people with similar interests and displays local advertisements for entertainment in the viewing area. Further, the system also allows businesses to update ads instantly to promote upcoming events, specials, entertainment, etc. These ads can be updated at any time and as many times as the business needs, plus they can be easily created and edited through the application and website.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

FIGS. 2A and 2B are block diagrams of a system for providing the geographic location based information of a plurality of people on a network in accordance with the preferred embodiment of the present invention;

FIG. 3A is an exemplary view of a user interface on the at least one electronic device of FIG. 1, illustrating a dynamic population mapping of the plurality of people based on the demographic characteristic of the plurality of people;

DETAILED DESCRIPTION OF THE PREFERRED EMBODIMENT

The following describes example embodiments in which the present invention may be practiced. This invention, however, may be embodied in many different ways, and the description provided herein should not be construed as limiting in any way. Among other things, the following invention may be embodied as methods or devices. As such, the present invention may take the form of an entirely hardware embodiment, an entirely software embodiment, or an embodiment combining software and hardware aspects. The following detailed descriptions should not be taken in a limiting sense.

In this document, the terms "a" or "an" are used, as is common in patent documents, to include one or more than one. In this document, the term "or" is used to refer to a nonexclusive "or," such that "A or B" includes "A but not B," but not A, and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage, in this document controls.

A wide range of location mapping systems and methods has been developed for providing geographical location data via a plethora of networks. However, these location sharing interfaces do not allow users to simultaneously determine the ratio of men to women in a particular location, establishment, or place. Traditional sharing interfaces do not provide access to paid advertisements by local establishments, events, etc. People using the current location sharing applications cannot view entire continents and determine the count of males and females throughout the viewing area/window which would allow them to get population estimates based on users in a network. Moreover, current systems do not embody the concept of anonymity (no user can identify another user) and coupled with the ability to only distinguish count of males and females within a viewing area/window. The present embodiment overcomes the shortcomings of prior embodiments by providing a dynamic location-based mapping system and method.

Figure 1:
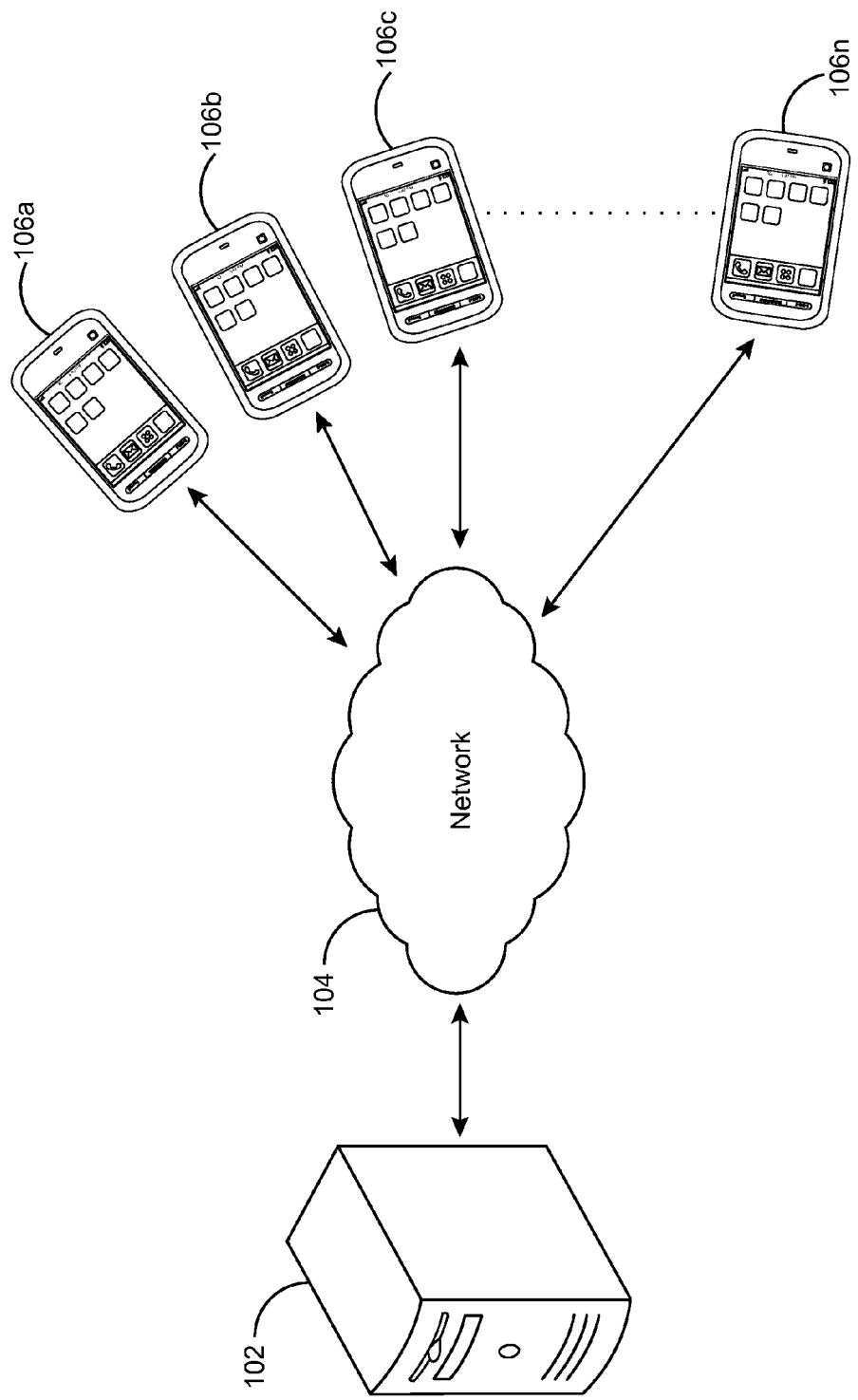
FIG. 1 is a diagrammatic view of a system for providing a geographic location based information of a plurality of people on a network in accordance with the preferred embodiment of the present invention.

Referring now to FIG. 1, a diagrammatic view of a system for providing a geographic location based information of a plurality of people on a network in accordance with the preferred embodiment of the present invention is illustrated and generally designated by the reference numeral 100. The system comprises a server 102 that can be coupled remotely to a plurality of electronic devices 106a, 106b, 106c ... 106n via a network 104 (or alternatively, the communications network). The server 102 is configured to provide the geographic location based information of the plurality of people in a cloud environment. The network 104 can correspond to a cloud network. As used herein, the cloud network 104 includes a style of computing in which computing resources such as application programs and file storage are remotely provided over the network. The network 104 may include a plurality of networks of any type, including a local area network (LAN), a wide area network (WAN), a metropolitan area network (MAN), a telephone network, such as the public switched telephone network (PSTN) or a public land mobile network (PLMN); an intranet, the Internet or a combination of networks. The PLMN may further include a packet-switched sub-network, such as, for example, general packet radio service (GPRS), cellular digital packet data (CDPD), or mobile IP sub-network.

The serves 102 comprises a cloud based server that can represent one and/or more hardware and software cloud servers providing multiple server functions. The server 102 hosts at least one software module programmed to populate maps of the plurality of people and associated interests, the plurality of locations and demographic characteristics and at least one database module adapted for storing the detailed activity maps, interests and demographic characteristics of the plurality of people. The plurality of electronic devices 106a through 106n can be implemented as a "thick" client and execute a client-installed application that is programmed to request maps of the plurality of people at the plurality of locations based on the demographic characteristics. The plurality of locations as referred to herein, may include any place where people get together (e.g., for a common purpose or interest) including, but not limited to, places for eating, visiting exhibitions, dancing, etc. For instance, a plurality of places include restaurants, nightclubs, casinos, bowling allies, bars, theaters, concert arenas, theme parks, public parks and stores (e.g., grocery stores, clothing stores, a shopping, mall, etc.), cafes, gas stations, stadiums, schools, and museums.

The client-installed application that provides the system runs on any mobile device or it may also run on a general purpose computer. For purposes of illustration and without limitation, the software may run on Palm®, Blackberry®, Windows Mobile®, or Open Handset Alliance® Android devices, iPhone devices or a personal computer running Windows®, OS X®, Linux, or any other operating system. The software that runs on the device may run in the background (e.g., as a service, daemon, etc.), it may run as a script on a webpage, or it may run as an application in the operating system on the device.

The plurality of electronic devices 106a through 106n and the server 102 is connected to the network 104 via wired or wireless links. The plurality of people may carry and/or use respective plurality of electronic devices 106a through 106n. The plurality of electronic devices 106a through 106n may include cellular radiotelephones, smartphones, cell phones, personal digital assistants (PDAs), personal communications systems (PCS) terminals, computers (e.g., laptop, tablet, desktop or palmtop computers), or any other type of appliance that includes a communication transceiver that permits the plurality of electronic devices 106a through 106n to communicate via the network 104.

In an embodiment, the plurality of electronic devices 106a through 106n may provide geographic location based information (e.g., GPS geo-location data) to the server 102. The server 102 may receive geographic location based information from the plurality of electronic devices 106a through 106n (e.g., GPS geo-location data), via the network 104 and may reference the received geographic location to determine how many people are currently located at each of the plurality of locations. The determined is count of the plurality of people at each of the plurality of locations is based on a demographic characteristic of the plurality of people and is used as an indicator of popularity of the plurality of locations. The server 102 may represent the count of the plurality of people at each of the plurality of locations as a pair of counters 118 in a plurality of blocks 116 (See FIG. 3) based on the demographic characteristic of the plurality of people to the plurality of electronic devices 106a through 106n via the network 104.

Referring now to FIGS. 2A and 2B are block diagrams of the system 100 for providing the geographic location based information of a plurality of people on a network in accordance with the preferred embodiment of the present invention. The server 102 comprises a transceiver 110 that is operated to receive a request for the geographic location based information of the plurality of people. A processor 112 on the server 102 having a first module 158 is configured to locate the plurality of people at the plurality of locations based on the received geographic location. A second module 160 at the processor 112 to determine a count of the plurality of people at each of the plurality of locations based on a demographic characteristic of the plurality of people and a third module 162 at the processor 112 to represent the count of the plurality of people at each of the plurality of locations as the pair of counters 118 in the plurality of blocks 116 based on the demographic characteristic of the plurality of people. Further, the processor 112 having a fourth module 164 is configured to update the count of the plurality of people at each counter 118 in each block 116 based on the demographic characteristic of the plurality of people. The server 102 further comprises a memory 114 that is operated to store information and instructions for execution by the processor 112.

The plurality of electronic devices 106a through 106n is configured to enable a connection with the server 102 via a user interface 108. The user interface 108 is an application programming interface (API) that is configured to receive the count of the plurality of people at each of the plurality of locations based on the demographic characteristic of the plurality of people. The user interface 108 is further configured to display the plurality of blocks 116 with the pair of counters 118. The count of the plurality of people is dynamically updated based on each of the plurality of locations and the demographic characteristic of the plurality of people. In an embodiment, the user interface 108 is hosted in a cloud platform that provides central processing for demographic characteristic of the plurality of people from each of the plurality of locations. Here, the cloud computing may replace the functionality provided by a central server. The cloud platform dynamically stores/updates GPS coordinates and settings, interests of the plurality of people of all network devices, stores advertisers static locations, updates advertisements based on inputs of the plurality of people at the plurality of locations and populates stored information on universal map shared by the plurality of people. The cloud platform receives labels from profile, stores and makes retrievable to all users on the network. Then receives request to filter user's map by a label and determines all users in viewing window of map that have that label saved in their profiles and then sends results to user.

FIG. 3A is an exemplary view of the user interface on the at least one electronic device of FIG. 1, illustrating a dynamic population mapping of the plurality of people based on the demographic characteristic of the plurality of people. The user interface 108 is provided with a search bar that enables a user to map the plurality of people at the plurality of locations. The demographic characteristic of the plurality of people is categorized by gender to determine a ratio of males to females. The user interface 108 shows the mapping of the plurality of people by the pair of counters 118 in the plurality of blocks 116. As shown in FIG. 3, the plurality of blocks 116 includes nine square blocks with two counters in each block 116. One counter 118 defines the count of the males and other counter 118 defines the count of the females. For instance, the plurality of blocks 116 may be represented as quadrants ($Q_0$, $Q_1$, $Q_2$ . . . $Q_n$) and the quadrants represent a range in latitude and longitude within the user interface 108. The system sums the count of the plurality of people within the range of these quadrants and displays the count via the pair of counters 118.

Figure 3B:
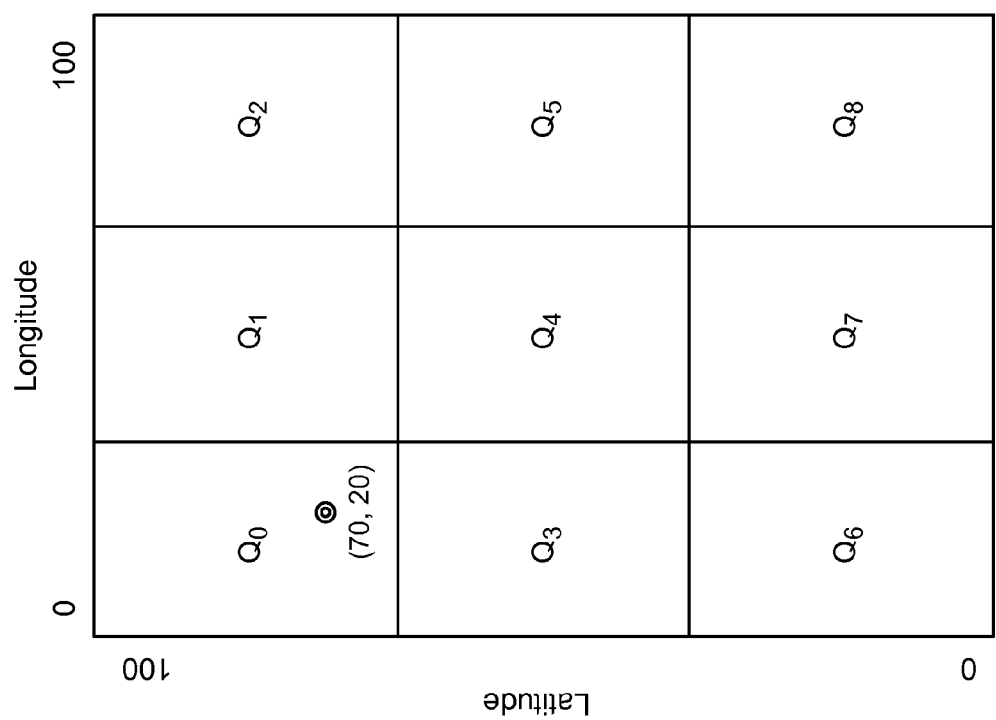
FIG. 3B illustrates a table showing quadrants representing a range in latitude and longitude.

FIG. 3B illustrates a table showing quadrants representing a range in latitude and longitude. For e.g. if the $Q_0$ represents the range with latitude 70 and longitude 20 or (70, 20), then the count of the plurality of people in that longitude and latitude is displayed in the $Q_0$ quadrant and the quadrant formula for $Q_0$ is sum($X_n$) if Latitude $66.66 \leq X_n \leq 100$ and Longitude $0 \leq X_n \leq 33.33$. In $Q_1$ quadrant, the quadrant formula for $Q_1$ is sum($X_n$) if Latitude $66.66 \leq X_n \leq 100$ and longitude $33.33 < X_n < 66.66$. In $Q_2$ quadrant, the quadrant formula for $Q_2$ is sum($X_n$) if Latitude $66.66 \leq X_n \leq 100$ and Longitude $66.66 \leq X_n \leq 100$. In $Q_3$ quadrant, the quadrant formula for $Q_3$ is sum($X_n$) if Latitude $33.33 < X_n < 66.66$ and Longitude $0 \leq X_n \leq 33.33$ and in $Q_4$ quadrant, the quadrant formula for $Q_4$ is sum($X_n$) if Latitude $33.33 < X_n < 66.66$ and Longitude $33.33 < X_n < 66.66$. In $Q_5$ quadrant, the quadrant formula for $Q_5$ is sum($X_n$) if Latitude $33.33 < X_n < 66.66$ and Longitude $66.66 \leq X_n \leq 100$, in $Q_6$ quadrant, the quadrant formula for $Q_6$ is $sum(X_n)$ if Latitude $0 \leq X_n \leq 33.33$ and Longitude $0 \leq X_n \leq 33.33$, in $Q_7$ quadrant, the quadrant formula for $Q_7$ is $sum(X_n)$ if Latitude $0 \leq X_n \leq 33.33$ and Longitude $33.33 < X_n < 66.66$ and in $Q_8$ quadrant, the quadrant formula for $Q_8$ is $sum(X_n)$ if Latitude $0 \leq X_n \leq 33.33$ and Longitude $66.66 \leq X_n \leq 100$. These ranges compare to the users coordinates that are stored on the cloud servers and dynamically update depending on viewing window.

The plurality of blocks 116 is configured to protect the anonymity of the plurality of the people, the plurality of locations of the plurality of people. The plurality of blocks 116 provides the user the count of the plurality of people at each of the one or more locations and distinguishes the count of males and females in each counter 118. The system 100 allows the user to view large counts of the plurality of people on the map by organizing into the plurality of blocks 116 with the pair of counters 118. Each counter 118 denotes a numerical figure of males and females respectively. Thus, the pair of counters 118 in each block 116 separately determines the count of males and females respectively among the plurality of people at the plurality of locations.

The user interface 108 allows the users to search desired locations, scroll across map and zoom in and out and view dynamically updated counts of males and to females. The user's personal information is not viewable to other users and the plurality of electronic devices 106a through 106n in the network 104 is not linked to one another. The locations of the users are not viewed since the pair of counters 118 is adding up the males and females at the plurality of locations and displayed as numerical figures in the respective counters 118. The system 100 allows the users to temporarily disable the is viewable location and can set specific locations where the users will not be counted.

At least one electronic device 106a is represented as a business entity/establishment who purchases advertisement space (Ad space) 120 from the client-installed application executed in the at least one electronic device 106a. The at least one electronic device 106a allows users to display the local specials/advertisements/businesses for entertainment in the advertisement space (Ad space) 120 on the user interface 108. The Ad space 120 offers perfect situation for establishing business for any business entity/establishment at e.g. food or entertainment industry. The at least one electronic device 106a allows the business entity/establishment to update advertisements instantly to promote current or upcoming events, specials, entertainment, etc. in the Ad space 120.

The Ad space 120 delivers digital content or advertisements to the user based upon the plurality of locations that the user want to go around. The Ad space 120 displays the location that is closest to the center point of the users at the bottom portion of the map. The system 100 allows the user to swipe through the advertisements and view more information clearly. The client-installed application may provide a list of general common interests/traits such as age range, relationship status, favorite music genre, favorite sports teams, etc. the users can select and then filter the map by the common interests/traits. The system 100 delivers search results, advertisements, or content, to the users based upon locations the users is known to have previously visited and the advertisements based upon the types of businesses that the users of the plurality of electronic devices 106a through 106n typically visits.

In one embodiment, the user interface 108 allows the user to choose specific interest and enables the user to update the map of others on the network 104. For instance, the user interface 108 allows the user to choose whether the user is single, in relationship or married. When another user chooses single, in relationship or married, the map of the user will only count and view the count of single, in relationship or married based on the selection. Thus, the system 100 allows the user to filter the map to view the plurality of people with similar interests.

Figure 4:
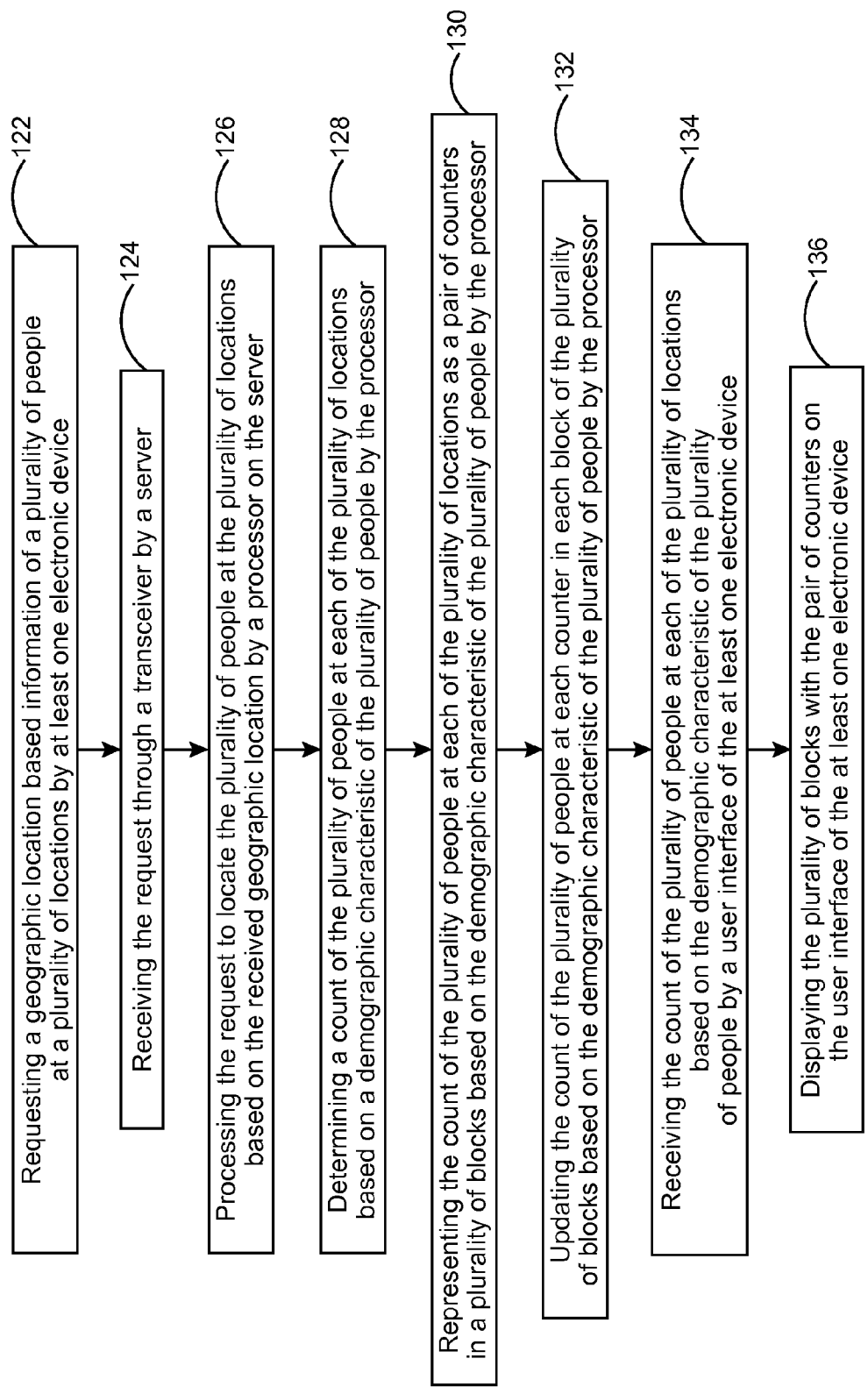
FIG. 4 is a flow chart illustrating method for providing geographic location based information of a plurality of people on a network in accordance with the preferred embodiment of the present invention.

FIG. 4 is a flow chart illustrating a method for providing geographic location based information of a plurality of people on a network in accordance with the preferred embodiment of the present invention. Initially, the at least one electronic device requests the geographic location based information of the plurality of people at the plurality of locations as indicated at block 122. A server receives the request through a transceiver as indicated at block 124. The request is processed by a processor on the server to locate the plurality of people at the plurality of locations based on the received geographic location as indicated at block 126. Then, the processor determines a count of the plurality of people at each of the plurality of locations based on a demographic characteristic of the plurality of people as indicated at block 128. Then, the processor represents the count of the plurality of people at each of the plurality of locations as a pair of counters in a plurality of blocks based on the demographic characteristic of the plurality of people as indicated at block 130.

The count of the plurality of people at each counter in each block of the plurality of block is updated based on a demographic characteristic of the plurality of people by the processor as indicated at block 132. A user interface on the plurality of electronic devices receives the count of the plurality of people at each of the plurality of locations based on the demographic characteristic of the plurality of people as indicated at block 134. Finally, the user interface on the plurality of electronic devices displays the plurality of blocks with the pair of counters as indicated at block 136. The pair of counters provides the count of the plurality of people at each of the plurality of locations based on the demographic characteristic of the plurality of people.

The system 100 described herein enables the plurality of people to make choices about the locations to visit by using popularity information derived from the current and/or past geographic location based information of the plurality of people. The system 100 obtains geographic location based information of the plurality of people from the plurality of electronic devices 106a through 106n and use the geographic location based information to determine the location of the plurality of people relative to the plurality of locations. When the location of the plurality of people is determined, the count of the plurality of people located at each of the plurality of locations is identified. Then, the count of the plurality of people is categorized based on the demographic characteristic of the plurality of people. The count of the males and females are represented by the pair of counters in the plurality of blocks 116. Thus, the ratio of males and females can be determined using the pair of counters in the plurality of blocks 116. The count of the plurality of people located at each location is used as an indication of a popularity of each location. For example, if the plurality of blocks 116 shows a large number of people in the pair of counters located at a certain restaurant relative to fewer people located at other restaurants can be used as an indication that the certain restaurant is more popular than the other restaurant. Similarly, if the plurality of blocks shows a large number of females in the counter located at a park comparative to males in is the counter can be used as an indication that the certain park is occupied with females than males. The plurality of people may view the pair of counters indicating the count of the plurality of people located at the different locations to select a location that they want to visit. The graphical representation may display current and/or past numbers of people located at the different business entities/establishments.

The system 100 is configured to stream location data in real time to yield a measure of how busy a number of business locations are. The system 100 allows the users to map search option, filter interests to view others with similar interests, set privacy that allow users the ability to set the home locations as invisible, set additional privacy that allow users the ability to set the current locations to invisible for a range of time up to four hours. Further, the system 100 displays advertisement banners that include local advertisements at bottom of map depending on user's interest. Multiple advertisements can be visible by swiping banner right or left to view next advertisement. Additionally, advertisement banners can be swiped in an upward motion to show more information. The users can tog in by downloading the client-installed application, choosing the option male or female and acknowledging an age requirement. The system 100 provides the ability to anonymously locate the plurality of people by accessing the GPS information and uploading it to a central server, where it is logged for retrieval. The application checks the user's location and updates the log in every five minutes. Thus the count of females and males are dynamically updated at the pair of counters 118 in the plurality of blocks 116.

Figure 5:
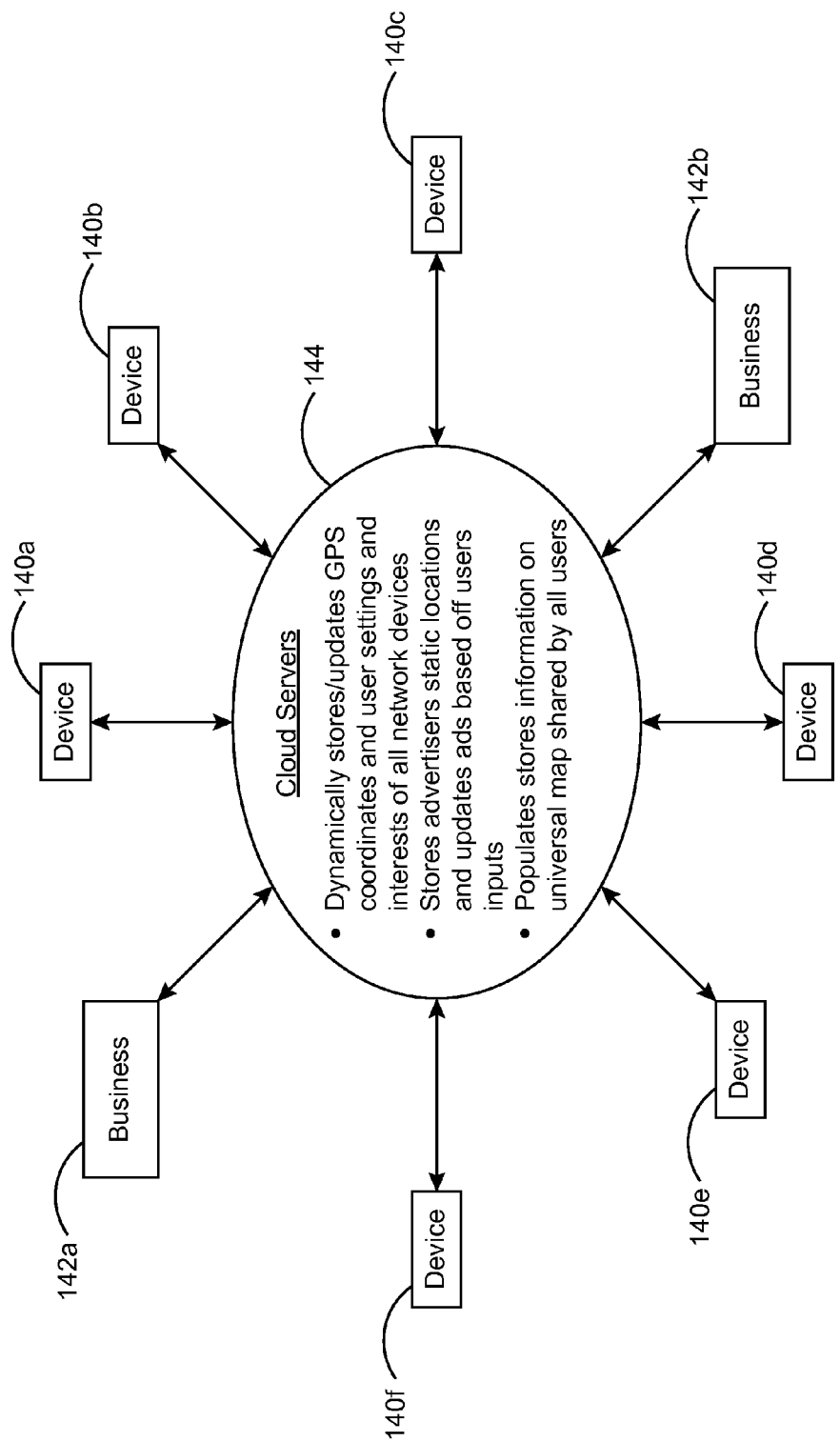
FIG. 5 is a flow diagram illustrating the storage and updation of geographic location based information of a plurality of people on a network in accordance with the preferred embodiment of the present invention.

FIG. 5 is a flow diagram illustrating the storage and updation of geographic location based information of a plurality of people on a network in accordance with the preferred embodiment of the present invention. The cloud servers 144 dynamically stores/updates GPS (Global Positioning System) coordinates and user settings and interests of all network devices 140a, 140b, 140c, 140d, 140e and 140f. The cloud server 144 stores advertisers' static locations and updates ads based on user's inputs. Further, the cloud servers 144 populate stored information on universal map shared by all users. The cloud servers 144 allow businesses 142a, 142b to update ads weekly to promote upcoming events, specials, entertainment, etc. Ad space is now available at the bottom of a map that businesses can use to post specials, deals, upcoming events or etc. in order to entice customers passing by their area to stop in. These ads can be updated at any time and as many times as the business needs in addition they can be easily created and edited through the app and website. With instantaneous updating of ads, this makes them act more as twitter feeds for businesses to connect to future and current customers. Here, customers can add the user's business to their Favorites and, in doing so, every time user's ad is updated, a notification is sent to the customers. Multiple ads per viewing area will be visible by swiping banner right or left to show next ad. Additionally, banners can be swiped in an upward motion to show more information. Ads can be designed and purchased directly in the app via an easy to use interface, which then the app will approve and post to its universal map.

Figure 6:
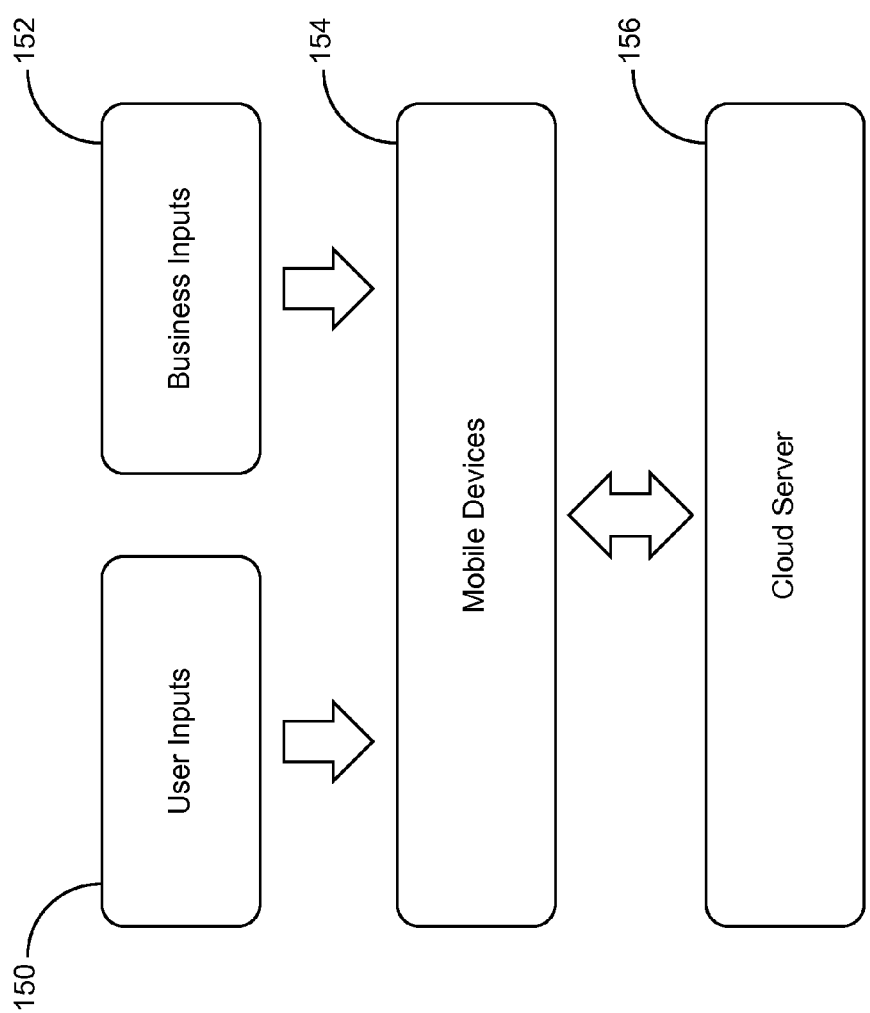
FIG. 6 is a block diagram illustrating data input paths for providing the geographic location based information of a plurality of people on a network in accordance with the preferred embodiment of the present invention.

FIG. 6 is a block diagram illustrating data input paths for providing the geographic location based information of a plurality of people on a network in accordance with the preferred embodiment of the present invention. The user inputs at block 150 and business inputs at block 152 are given to the mobile devices 154. At block 156, the cloud server dynamically stores/updates GPS coordinates and user settings and interests of all network devices, stores advertisers static locations and updates ads based off users inputs and populates stored information on universal map shared by all users.

Figure 7:
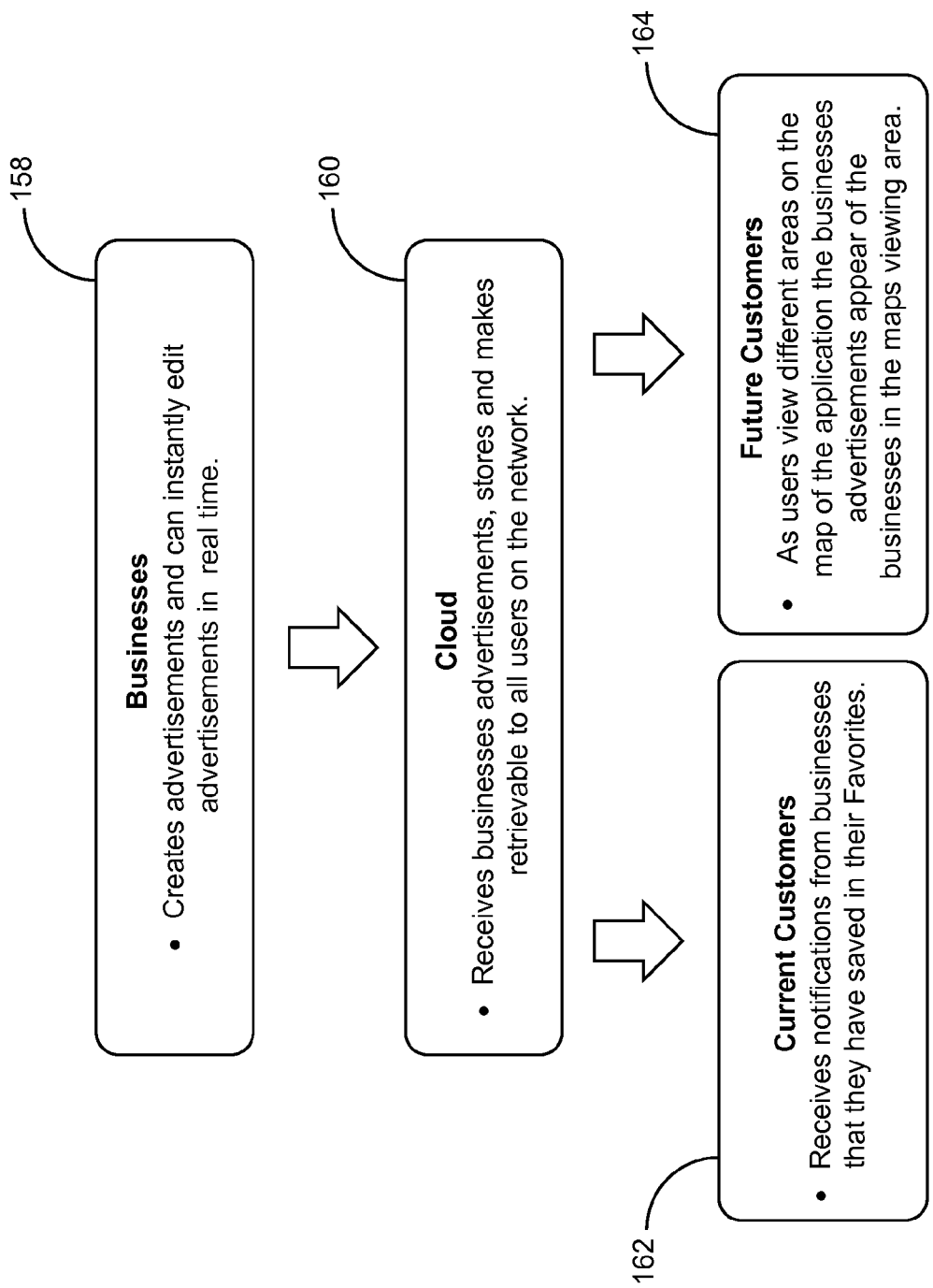
FIG. 7 illustrates a schematic block diagram of creating and editing advertisements in the system for providing a geographic location based information of a plurality of people on a network in accordance with the preferred embodiment of the present invention.

FIG. 7 illustrates a schematic block diagram of creating and editing advertisements in the system for providing a geographic location based information of a plurality of people on a network in accordance with the preferred embodiment of the present invention. Ad space is now available at the bottom of a map and businesses create advertisements and can instantly edit advertisements in real time to entice future customers passing by on the map on their device or current customers that have added the business to their favorites at block 158. The cloud platform receives businesses advertisements, stores and makes retrievable to all users on the network as depicted at block 160. With instantaneous updating of ads, makes them act more as twitter feeds for businesses to connect to future and current customers. Customers can add the user's business to their Favorites and, every time the user's ad is updated, a notification is sent to customers. Current customers receive notifications from businesses that they have saved in their Favorites at block 162. At block 164, for future customers, as users view different areas on the map of the application the businesses advertisements appear of the businesses in the maps viewing area.

Figure 8:
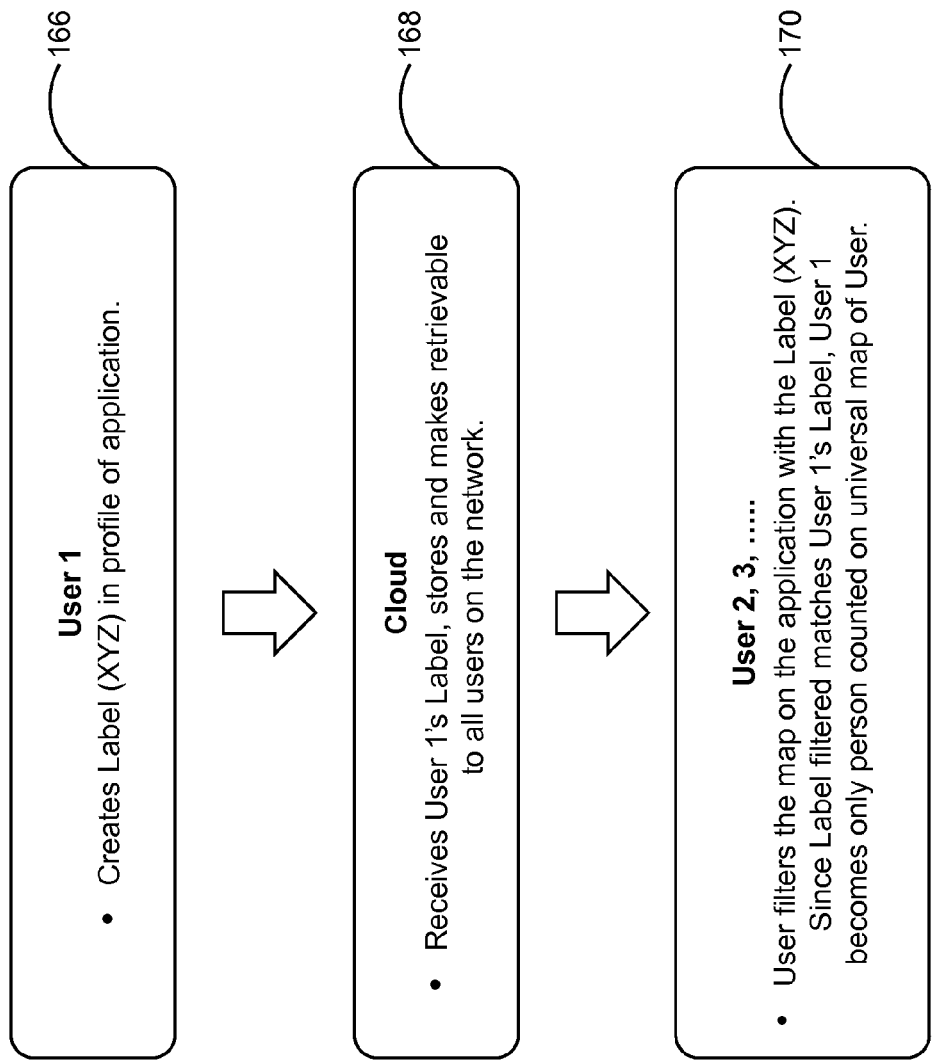
FIG. 8 illustrates a schematic block diagram of creating a label in the system for providing geographic location based information of a plurality of people on a network in accordance with the preferred embodiment of the present invention.

FIG. 8 illustrates a schematic block diagram of creating a label in the system for providing geographic location based information of a plurality of people on a network in accordance with the preferred embodiment of the present invention. The user's ability to create any word or phrase, pass it on in any way and it then allows other users to only be visible on the map to other users sharing that label. E.g. A big organization like Apple could have all their employees add in the label "Apple Employee" and thus all Apple employees could anonymously view where other Apple employees are when going out to a company event or when out with each other celebrating an achievement. Team building events would be a good example. A user say "User 1" creates label (XYZ) in profile of application as depicted at block 166. Then at block 168, the cloud platform receives User 1's label, stores and makes retrievable to all users on the network. At block 170, other users such as User 2, 3, etc. filter the map on the application with the label (XYZ). Since Label filtered matches User 1's label, User 1 becomes only person counted on universal map of user.

Figure 9:
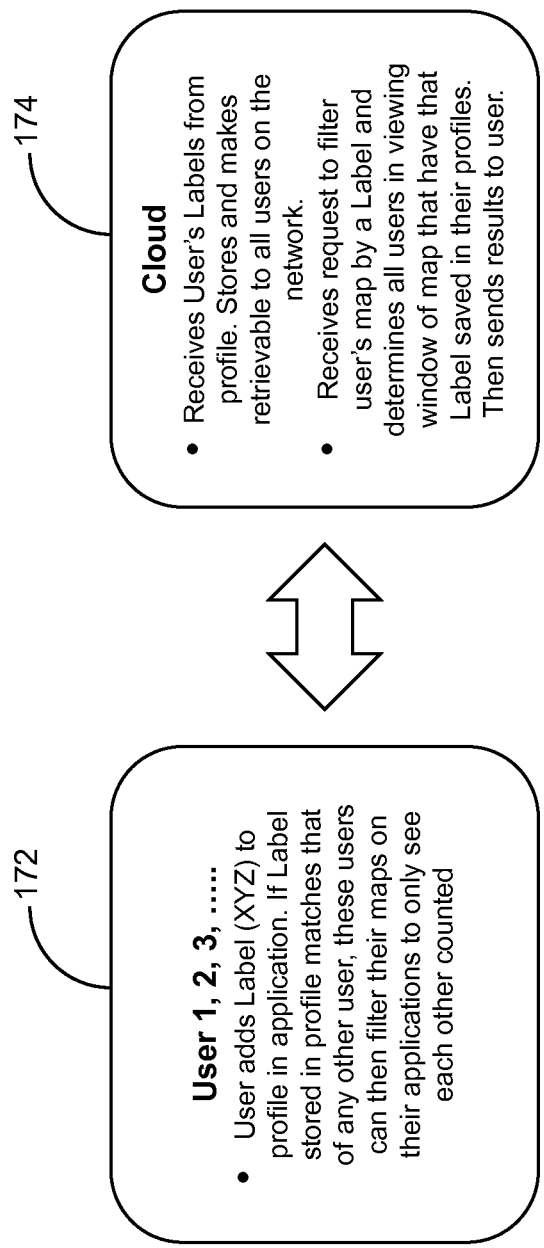
FIG. 9 illustrates a schematic block diagram of sharing a label in the system for providing geographic location based information of a plurality of people on a network in accordance with the preferred embodiment of the present invention.

FIG. 9 illustrates a schematic block diagram of sharing a label in the system for providing geographic location based information of a plurality of people on a network in accordance with the preferred embodiment of the present invention, At block 172, the user adds label (XYZ) to profile in application. If label stored in profile matches that of any other user, these users can filter their maps on the applications to only see each other counted. As depicted in block 174, the cloud server receives user's labels from profile. The cloud server stores and makes retrievable to all users on the network. The cloud server receives request to filter user's map by a Label and determines all users in viewing window of map that have that Label saved in their profiles and then sends results to the user.

While a particular form of the invention has been illustrated and described, it will be apparent that various modifications can be made without departing from the spirit and scope of the invention. For example, the inner panel 20 may be made of different materials or sizes that can be customized to fit with any cabinet door. Accordingly, it is not intended that the invention be limited, except as by the appended claims.

What is claimed is:

1. A method for providing a geographic location based information of a plurality of people on a network, the method comprising:
   (a) configuring a server to provide the geographic location based information of the plurality of people;
   (b) operating a transceiver to receive a request for the geographic location based information of the plurality of people;
   (c) locating the plurality of people at the plurality of locations based on the received geographic location by a processor;
   (d) determining a count of the plurality of people at each of the plurality of locations based on a demographic characteristic of the plurality of people by the processor;
   (e) representing the count of the plurality of people at each of the plurality of locations as a pair of counters in each of a plurality of blocks based on the demographic characteristic of the plurality of people by the processor;
   (f) updating a count of the plurality of people at each counter in each of the plurality of blocks based on the demographic characteristic of the plurality of people by the processor;
   (g) storing information and instructions to a memory for execution by the processor;
   (h) receiving the count of the plurality of people at each of the plurality of locations based on the demographic characteristic of the plurality of people by at least one electronic device having a user interface being coupled through the network to the server; and
   (i) displaying the plurality of blocks with the pair of counters using the user interface.

2. The method of claim 1 wherein the method allows displaying advertisement banners at a bottom portion of a map depending on a user's interest.

3. The method of claim 2 wherein the method allows the user to choose specific interest and enables the user to update the map of others on the network.

4. The method of claim 1 wherein the method determines the ratio of males and females using the pair of counters in each of the plurality of blocks.

5. A system for providing a geographic location based information of a plurality of people on a network, the system comprising:
   a server being configured to provide the geographic location based information of the plurality of people, the server comprising:
      a transceiver being operated to receive a request for the geographic location based information of the plurality of people;
      a processor being configured to:
         locate the plurality of people at a plurality of locations based on the received geographic location;
         determine a count of the plurality of people at each of the plurality of locations based on a demographic characteristic of the plurality of people;
         represent the count of the plurality of people at each of the plurality of locations as a pair of counters in a plurality of blocks based on the demographic characteristic of the plurality of people; and
         update the count of the plurality of people at each counter in each block of the plurality of blocks based on the demographic characteristic of the plurality of people; and
      a memory being operated to store information and instructions for execution by the processor; and
   at least one electronic device having a user interface being coupled through the network to the server adaptable to receive the count of the plurality of people at each of the plurality of locations based on the demographic characteristic of the plurality of people, the user interface being configured to display the plurality of blocks with the pair of counters;
   whereby the count of the plurality of people is dynamically updated based on each of the plurality of locations and the demographic characteristic of the plurality of people.

6. The system of claim 5 wherein the system comprises a plurality of blocks in a viewing window including a pair of counters within each of the plurality of blocks which dynamically update with current number of people/users in the viewing window while moving across a map.

7. The system of claim 5 wherein each of the plurality of blocks determine the number of males and females within a given area and each of the pair of counters within each of the plurality of blocks determines the number of males and females.

8. The system of claim 5 wherein the plurality of blocks is configured to protect the anonymity of the plurality of people and a plurality of locations of the plurality of people.

9. The system of claim 5 wherein the pair of counters provides the count of the plurality of people at each of the plurality of locations based on the demographic characteristic of the plurality of people.

10. A system for providing a geographic location based information of a plurality of people on a network based on the demographic characteristic of the plurality of people, the system comprising:
   a server being configured to provide the geographic location based information of the plurality of people, the server comprising:
      a transceiver being operated to receive a request for the geographic location based information of the plurality of people;
      a processor being configured to enable:
         a first module to locate the plurality of people at a plurality of locations based on the received geographic location by the processor on the server;
         a second module to determine a count of the plurality of people at each of the plurality of locations based on a demographic characteristic of the plurality of people by the processor;
         a third module to represent the count of the plurality of people at each of the plurality of locations as a pair of counters in a plurality of blocks based on the demographic characteristic of the plurality of people by the processor; and
         a fourth module to update the count of the plurality of people at each counter in each of the plurality of blocks based on the demographic characteristic of the plurality of people by the processor;
      a memory being operated to store information and instructions for execution by the processor; and
   at least one electronic device having a user interface being coupled through the network to the server adaptable to receive the count of the plurality of people at each of the plurality of locations based on the demographic characteristic of the plurality of people, the user interface being configured to display the plurality of blocks with the pair of counters;

whereby the count of the plurality of people is dynamically updated based on each of the plurality of locations and the demographic characteristic of the plurality of people.

11. The system of claim 10 wherein the user interface allows the users to search desired locations, scroll across a map and zoom in and out and view dynamically updated counts of males and females.

12. The system of claim 11 wherein the system displays ads which pop up on bottom of the map depending on user's input or by the user panning the map across a region where businesses are advertising.

* * * * *